United States Patent Office 3,385,916
Patented May 28, 1968

3,385,916
PROCESS FOR PRODUCING MICROPOROUS
POLYURETHANE FIBRIDS
Esperanza G. Parrish, Wilmington, Del., and John Farago,
Richmond, Va., assignors to E. I. du Pont de Nemours
and Company, Wilmington, Del., a corporation of
Delaware
No Drawing. Filed Nov. 3, 1965, Ser. No. 506,272
11 Claims. (Cl. 264—50)

The novel process of this invention concerns making microporous polyurethane fibrids which are useful for forming sheet materials and in particular microporous sheet materials.

The term "fibrids" designates a non-rigid, wholly synthetic polymeric particle capable of forming paperlike structures on a paper-making machine. Thus, a fibrid possesses ability to form a water-leaf when a plurality of the fibrids are deposited from a liquid suspension upon a screen. A fibrid is non-granular and has at least one dimension of a minor magnitude relative to its largest dimension, i.e., a fibrid is fiberlike or filamentlike. Descriptions of typical fibrids are in Guandique et al. U.S. Patent 2,988,782, issued June 20, 1961, and Morgan U.S. Patent 2,999,788, issued Sept. 12, 1961.

The term "synthetic polymer" designates a polymeric material synthesized by man as distinguished from a polymeric product of nature and derivatives thereof.

There are several processes known in the art for forming fibrids but they are not generally applicable for economical commercial production of polyurethane fibrids. One such process is the interfacial polymerization of two monomer solutions which forms a polymeric gel which is removed from the interface and is then sheared into fibrids. When this process is used with a polyurethane polymer, fibrids result which are not suitable for forming a microporous sheet material useful as a leather replacement. In another process, a polymer is dissolved in a solvent for the polymer and this solution is then added to a non-solvent for the polymer which is under shear conditions. The polymer is precipitated and subsequently sheared into fibrids. However, this process is uneconomical since it requires expensive solvents, such as dimethyl formamide, and also, requires use of polymer solutions which have a low solids content since it is not presently physically possible to apply shearing conditions which are sufficient to fibridate a high solids polymer solution.

The process of the present invention readily forms useful fibrids without the use of expensive solvents. Preferably, a prepolymer solution having a high solids content is used, thereby making the process of this invention practical and efficient. Furthermore, the process of this invention can form fibrids from polyfunctional materials which form cross-linked polymers, while the prior art, in general, is limited to the use of linear polymers for fibrid formation.

It is an object of this invention to provide a novel and economical process for the production of polyurethane fibrids suitable for making microporous sheet materials which are particularly useful as a leather replacement in footwear.

This invention provides a novel process for the production of microporous polyurethane fibrids in which (a) A polyurethane prepolymer solution, having a radial spread rate (hereinafter defined) of about 1 to 40 centimeters/second (cm./sec.), is formed from an active hydrogen containing polymeric material which has terminal N=C=O groups or terminal

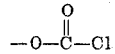

groups;

(b) A polyurethane film is formed by adding the prepolymer solution to an amine solution under conditions such that the prepolymer solution spreads freely on the surface of the amine solution; the amine solution has a pH of at least 8 and comprises a non-solvent for the resulting polyurethane polymer and at least one amine which has at least two amino nitrogen atoms each having at least one active hydrogen atom attached thereto;

(c) The polyurethane polymer film is sheared into microporous polyurethane fibrids after the film is formed; the shearing conditions are such that the power number (hereinafter defined) of the system is about 0.03 to 3.

PREPOLYMERS

The prepolymer for the polyurethane polymer is prepared by either reacting an organic diisocyanate with an active hydrogen containing polymeric material to form an isocyanate terminated polyurethane prepolymer or by reacting phosgene with an active hydrogen containing polymeric material to form a prepolymer with terminal chloroformate groups. Preferably, the prepolymers are prepared by mixing one or more polyether glycols or polyhydroxy compounds or hydroxy-terminated polyesters with a molar excess of organic diisocyanate and heating the mixture to a temperature of about 50 to 110° C. to form a prepolymer having terminal —NCO groups. An alternate procedure is to form a bis-chloroformate prepolymer by reacting a molar excess of phosgene with a polyether glycol or polyhydroxy compound or hydroxy-terminated polyester to form a prepolymer having terminal chloroformate groups. One procedure for forming a bis-chloroformate is described in Example 2 of Carter et al. U.S. Patent 2,835,654, issued May 20, 1958.

The polyurethane prepolymers are formed from aliphatic, cycloaliphatic, aromatic or mixtures of aliphatic and aromatic polyol segments which include polyalkyleneether glycols having $C_2$ to $C_{12}$ alkylene segments and hydroxy-terminated polyesters of $C_3$ to $C_{12}$ aliphatic dicarboxylic acids, or saturated cyclic dicarboxylic acids or aromatic dicarboxylic acids. Other polyols which are useful include polycycloalkyleneether glycols, such as those having cyclopropyl, cyclobutyl, cyclopentyl, cyclohexyl, cycloheptyl and cyclooctyl segments; arylenealkyleneether glycols, such as those having aromatic rings, such as phenyl, naphthyl, thiophene, furyl, N-alkyl pyrryl and pyridyl segments in the chain of the alkylene segment; dihydroxyaryl segments, such as catechol, resorcinol, p-hydroxyquinone, bis-(p-hydroxyphenyl)-propane, methylene bis-(4-hydroxyphenyl), 4,4'-dihydroxybiphenyl, dihydroxynaphthyl, dihydroxythiophene, dihydroxyfuran, dihydroxy-N-alkylpyrrole, dihydroxypyridyl and the like; polyalkyleneether-thioether glycols; polyalkyleneether-N-alkyl substituted amines; and mixtures thereof. Triols, such as trimethylol propane, and polyols, such as pentaerythritol, glucose, sorbitol, sucrose, and the like, are also useful.

Polyalkyleneether glycols are the preferred active hydrogen containing material for the prepolymer formation. The most useful polyglycols have a molecular weight of 300 to 5000, preferably 400 to 4000; some of these polyglycols are, for example, polyethyleneether glycol, polypropyleneether glycol, polytetramethyleneether glycol, polyhexamethyleneether glycol, polyoctamethyleneether glycol, polynonamethyleneether glycol, polydecamethyleneether glycol, polydodecamethyleneether glycol, and mixtures thereof. Polyglycols containing several different radicals in the molecular chain, such as the compound $HO(CH_2OC_2H_4O)_nH$ wherein $n$ is an integer greater than 1 can also be used.

The preferred polyurethane prepolymers have terminal —NCO groups and are prepared with at least a major portion of an aromatic, aliphatic or cycloaliphatic diisocyanate or mixtures thereof; for example, tolylene-2,4-diisocyanate, tolylene-2,6-diisocyanate, m-phenylene diisocyanate, biphenylene-4,4'-diisocyanate, methylene bis-(4-phenyl isocyanate), 4-chloro-1,3-phenylene diisocyanate, naphthalene-1,5-diisocyanate, tetramethylene-1, 4 - diisocyanate, hexamethylene - 1,6-diisocyanate, decamethylene - 1,10 - diisocyanate, cyclohexylene - 1,4 - diisocyanate, methylene bis-(4-cyclohexyl isocyanate), tetrahydronaphthalene diisocyanate, xylylene diisocyanate, $\alpha,\alpha,\alpha',\alpha'$-tetramethyl xylylene diisocyanate, bis-(2-isocyanotoethyl) - fumarate, bis - (2 - isocyanototethyl)-carbonate, and bis-(2-isocyanotoethyl)-4-cyclohexene-1, 2-dicarboxylate. Preferred diisocyanates are methylene bis-(4-phenyl isocyanate) and bis-(2-isocyanatoethyl)-fumarate.

Polyesters can be used instead of or in conjunction with the polyalkyleneether glycols, particularly those formed by reacting acids, esters or acid halides with glycols. Suitable glycols are polyalkylene glycols, such as methylene-, ethylene-, propylene-, tetramethylene-, decamethylene glycol; substituted polyalkylene glycols, such as 2,2-dimethyl-1,3-propanediol, trimethylol propane, glycerine and the like; cyclic glycols, such as cyclohexanediol; aromatic glycols, such as xylene glycol, and aromatic diols, such as cathechol, resorcinol, p-hydroxyquinone, bis-(p-hydroxyphenyl)-propane and the like. Aliphatic glycols are preferred when maximum product flexibility is desired. These glycols are reacted with aliphatic, cycloaliphatic or aromatic dicarboxylic acids or lower alkyl esters or ester forming derivatives to produce relatively low molecular weight polymers like those indicated for the polyalkyleneether glycols. Acids for preparing such polyesters are succinic, adipic, suberic, sebacic, terephthalic and hexahydroterephthalic acids and the alkyl and halogen substituted derivatives of the acids.

Bis-chloroformates, i.e., prepolymers having terminal chloroformate groups, can be formed from any of the abovementioned polyether polyols or hydroxy terminated polyesters and reacted with an amine solution under shear conditions to form microporous fibrids. However, the preferred prepolymers have terminal —NCO groups.

In operating this invention, a prepolymer solution having a concentration greater than 10% prepolymer solids and a radial spread rate of about 1 to 40 cm./sec. is first prepared using suitable solvents. Preferably, the prepolymer solution has about 30 to 60% prepolymer solids concentration and a radial spread rate of about 2 to 20 cm./sec. The solvent used for the prepolymer solution is preferably a non-solvent for the polyurethane polymer to be prepared and preferably, should be miscible with the amine solution to be used, but other solvents may be used which do not have the above characteristics. Obviously, the choice of solvent will vary for different prepolymer compositions. When an aqueous amine solution is used, any of the following solvents for the prepolymer are useful: acetone, tetrahydrofuran, dimethyl ether of ethylene glycol, acrylonitrile dimethyl ether of diethylene glycol, tetramethylene sulfone, tetrachloroethylene, xylene, toluene, methylethyl ketone, methylisobutyl ketone, acetonitrile, dimethyl formamide, dimethyl acetamide, N-methyl pyrrolidone, methyl formate, ethylformate, ethyl acetate and butyl acetate. Preferable solvents are tetrahydrofuran, acetone, dioxane and methylethyl ketone.

DETERMINATION OF RADIAL SPREAD RATE OF PREPOLYMER SOLUTION

The term "radial spread rate" refers to the average rate at which the polyurethane prepolymer solution spreads over the surface of the amine solution which is used in the fibridation process.

In determining the radial spread rate of a prepolymer solution, the identical prepolymer solution and amine solution and temperature conditions which are used in the fibridation process are employed. The amine solution is placed in a suitable container. A droplet of the prepolymer solution is dropped onto the surface of the amine solution from a specified height. The rate at which the prepolymer droplet expands over the surface of the amine solution is determined. As mentioned previously, prepolymer solutions which form useful fibrids have a radial spread rate of 1 to 40 cm./sec. and preferably 2 to 20 cm./sec.

The test method which is used to determine radial spread rates of a prepolymer solution on the corresponding amine solution comprises dropping the polymer solution from a No. 26 hypodermic needle, which gives a droplet of about 0.15 cm. diameter, from a height of about 15 cm. onto the amine solution. The radial spread rate of the droplet on the surface of the amine solution is measured by photographing the spreading droplet with a high speed motion picture camera operating at about 1100 frames/sec. As a reference point, a metric ruler divided into millimeters and centimeters is placed directly behind the point of impact of the droplet. The size of the droplet is measured as it spreads on the surface of the amine solution and the time for spreading is readily determined from the speed at which the camera is operating from which the average radial spread rate is easily calculated.

AMINE SOLUTION

Amine solutions which form useful fibrids have a pH of at least about 8, preferably 9 to 12, and consist of a non-solvent for the polyurethane polymer, preferably water, and at least 0.01 molar and preferably 0.05 to 0.5 molar concentration of an amine which has at least two functional groups each bearing an active hydrogen atom bonded to an amino nitrogen atom and which is capable of reacting with the prepolymer to form a polyurethane polymer.

With the preferred isocyanate terminated prepolymer, the amine acts as a chain-extender to form a polyurethane polymer with recurring polyurea units, i.e., a unit having the structure

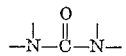

When the amine is used with a chloroformate terminated prepolymer, i.e., a prepolymer having terminal units of the structure

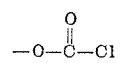

a polyurethane polymer is formed having the recurring structural unit

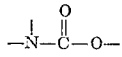

Examples of such amine compounds are hydrazine, substituted hydrazine, both primary and secondary amines, dimethyl piperazine, hexamethylene diamine, 1,4-diamino piperazine, ethylene diamine, diethylene triamine, 1,4-butane diamine, trimethylene diamine and mixtures thereof. The preferred chain-extenders are hexamethylene diamine, ethylene diamine and diethylene triamine.

The criterion for selection of non-solvents, i.e., for the polyurethane polymer, used in the amine solutions is the effect the non-solvent has on the polyurethane polymer. Suitable non-solvents are glycol monoethyl ether, water, polyols, such as ethylene glycol, glycerol, methanol, ethanol, hydrocarbons, such as hexane, octane, benzene, petroleum naphtha and toluene and chlorinated hydrocarbons, such as tetrachloroethylene and chloroform and mixtures thereof. However, the preferred non-solvent is water.

The operable temperature range for the process of this invention is about 0° C. to about 100° C. with the preferred range being about 15° C. to 60° C.

Thickeners are often used in the amine solution to give optimum conditions for fibrid formation. A wide variety of well known thickeners can be used, such as "Polyox" resins which are high molecular weight water-soluble polyethyleneether glycol resins, carboxymethyl cellulose, alkali salts of polymethacrylic acid or polyacrylic acid, polyvinyl alcohol, natural resins and gums, such as guar gum, sucrose, glucose, polysaccharides and other sugars, sodium alginate, karaya gum, gum tragacanth, methyl cellulose, gum arabic and starch.

FIBRID FORMATION

Useful fibrids are formed by adding a polyurethane prepolymer solution to an amine solution under such conditions that the prepolymer solution spreads freely on the amine solution forming a thin polyurethane film which is then sheared into fibrids.

The thin polyurethane film must be sheared while it is still in a deformable state to form useful fibrids. By deformable state, it is meant that all the prepolymer of the polyurethane film has not entirely reacted with the amine solution. In most systems, the film is sheared into fibrids within about 4 seconds, and preferably, with about 0.2 to 2 seconds after it is formed. But under certain conditions and with some prepolymers, it is possible for the polyurethane film to remain in a deformable state longer than 4 seconds; then under these conditions, the film could still be sheared into useful fibrids.

In one method for forming fibrids, the amine solution is agitated in a mixing apparatus, such as a "Waring Blendor," with sufficient force to form fibrids as the prepolymer is added to the shoulder of the vortex created by the agitation of the amine solution. The prepolymer spreads freely and a polyurethane film is formed which is subsequently sheared into fibrids while the film is still in a deformable state, i.e., within about 4 seconds after the film is formed.

In another method which is similar to the above, the prepolymer is dropped directly on the blades of the mixing apparatus which mechanically spreads the prepolymer solution in the vortex of the amine solution. A polyurethane film is formed and sheared into fibrids in an extremely rapid succession and for all practical purposes, it can be said the formation and shearing of the polyurethane film occurs almost instantaneously.

With either method, it is important that the prepolymer is allowed to spread into a thin film as it reacts with the amine solution before it is sheared into fibrids. Polyurethane films with a thickness of 0.1 to 20 microns form useful fibrids but film thicknesses of about 1 to 10 microns are preferred.

Fibrids prepared by the process of this invention are classified according to the Clark classification test (Tappi 33, 294–8, No. 6 (June) 1950) with the following results: less than 10% of the fibrids are retained on a 6-mesh screen and at least 90% are retained on a 300-mesh screen.

DETERMINATION OF SHEAR CONDITIONS

To form fibrids from the polyurethane film, a shearing force sufficient to cut the film into fibrids is required. The shearing force necessary in a system to shear a polyurethane film into fibrids can be expressed as a dimensionless number which is herein referred to as a Power Number (P.N.). The power number of any system for forming fibrids is dependent upon density of the amine solution, shape of the impeller or agitator, speed of the agitator, and power input into the system. The P.N. is determined by the formula $$P.N. = \frac{g_c P}{L^5 p n^3}$$

in which $g_c$ = gravitational conversion factor (lb. mass) (ft.)/(lb. force) (sec.) (sec.).

$L$ = characteristic dimension of an agitator or an impeller; for example, the characteristic dimension of a simple turbine mixer is the length of the stirrer blade from tip to tip. (ft.).
$n$ = agitator speed (revolutions per second)
$P$ = agitator power (ft.-lb./sec.)
$p$ = liquid density—the average density of the amine solution containing fibrids as it is being agitated (lb./cubic ft.)

The above is a standard formula based on dimensional analysis and correlates power requirements of various agitated systems and is shown in John H. Perry, "Chemical Engineers' Handbook," 4th Edition, Section 5, page 57, McGraw-Hill Book Company, Inc., 1963.

The P.N. of systems which form useful fibrids is about 0.03 to 3, and preferably, about 0.1 to 2.

FIBRID SHEET MATERIALS

After the fibrids are formed, they are filtered from the amine solution by conventional means and washed several times with water. The washed fibrids are then dispersed in water to form a slurry and shaped into a water-leaf by using conventional paper-making equipment and techniques. The water-leaf can then be formed into felts, tiles and other items by well known methods. Typical methods of forming sheets from the fibrids resulting from the process of this invention and useful products therefrom are disclosed in Morgan U.S. Patent 2,999,788, issued Sept. 12, 1961, columns 49 through 56, which are hereby incorporated by reference.

Particularly useful sheet materials formed from the fibrids resulting from the process of this invention have a permeability value (P.V.) of about 1000 to 15,000 g./hr./100m.$^2$ (based on a sheet about 50 mils thick) and a tensile strength (T.S.) of about 0.5 to 3 lb./in./oz./sq. yd. In a single ply sheet, these two properties are conveniently combined in a single term known as a Quality Factor (Q.F.). Quality Factor is the product of the permeability value (P.V.) and tensile strength (T.S.), with the P.V. and T.S. having the units indicated above. Useful fibrid sheets have a Q.F. of about 2500 to 30,000.

To give sheet materials which are formed from fibrids of this invention other desirable properties, a variety of materials may be added to the prepolymer solution before the fibrids are formed with the requirement being that these materials are unreactive with the prepolymer. For example, the following may be used: polymers, such as polyvinyl chloride, polyethylene, polypropylene, polystyrene and acrylics such as methyl methacrylate; pigments, such as carbon black and titanium dioxide; dyes; finely divided fillers, such as sand, asbestos, glass, wood pulp, calcium carbonate, talc, pumice and the like.

One particularly useful article which is made from fibrids produced by the process of this invention is a leatherlike microporous material using the process of Bundy U.S. Patent 3,100,733, issued Aug. 13, 1963, which is hereby incorporated by reference. The process disclosed in the Bundy patent involves forming a water-leaf of fibrids from a polyurethane polymer, pressing the water-leaf while exposing one surface to an elevated temperature sufficient to weld the fibrids to each other on the exposed side of the sheet to form a smooth dense surface which is microporous in structure while the other surface of the water-leaf is kept sufficiently cool to prevent welding of the fibrids.

When forming a leatherlike material which can be used for shoes, gloves, coats, handbags and the like from the polyurethane fibrids of this invention, it is desirable to form a structure of two layers. The first layer, which is the back side of the material, has from 0 to 50% by weight of fibers, such as nylon, rayon, polyacrylonitrile, and polyester fibers mixed with the polyurethane fibrids. The second layer which is to form the smooth side of the sheet contains from 95 to 100% of the polyurethane fibrids and 0 to 5% of one of the aforementioned fibers.

After the two-layer sheet is formed by standard paper-making techniques, the second layer is subjected to an elevated temperature to give a smooth microporous leatherlike product.

The following examples illustrate the invention; all quantities shown are on a weight basis unless otherwise indicated.

Example 1.—Preparation of prepolymer solution

The following ingredients are charged into a conventional reaction vessel equipped with a stainless steel stirrer, thermometer and means to introduce nitrogen and reagents, and a reflux condenser:

| | Parts by weight |
|---|---|
| Polyethyleneether glycol (molecular weight 1000) | 33.0 |
| Polyethyleneether glycol (molecular weight 1025) | 33.0 |
| Methylene bis-(4-phenylisocyanate) | 33.0 |
| Total | 99.0 |

The mixture is blanketed with nitrogen and is heated with constant agitation to about 110° C. and held at this temperature for about 90 minutes. The prepolymer is then cooled to room temperature and a prepolymer solution is prepared by dissolving about 30.8 parts of prepolymer in about 52.9 parts tetrahydrofuran.

Preparation of fibrids

A chain-extender solution is prepared as follows:

| | Parts by weight |
|---|---|
| Portion 1: | |
| Water at 50° C. | 2000 |
| "Polyox" WSR-301 (high molecular weight water-soluble polyethyleneether glycol resin) | 15 |
| Porton 2: | |
| Hexamethyene diamine | 23 |
| Total | 2038 |

Portion 1 is prepared by slowly sifting the "Polyox" resin into the water while it is being agitated to insure that the resin is well dispersed and to avoid the formation of gel particles. Portion 2 is then slowly added to Portion 1 with constant agitation. The resulting chain-extender solution has a viscosity of 0.5 poise (Brookfield Viscometer No. 2 spindle at 30 r.p.m.); a pH of 11.3 and a density of about 1 g./cc.

The radial spread rate of the prepolymer solution is measured using a small portion of the chain-extender solution according to the aforementioned high speed motion picture technique and determined to be about 5.5 cm./sec.

The chain-extender solution is transferred to a one gallon commercial "Waring Blendor" Model CB–4 in which the blender's blade diameter is about 3 inches. A tachometer is attached to the drive shaft of the blender so that the revolutions per minute of the blender blades can be read directly. The chain-extender solution is stirred at about 6000 r.p.m. which requires a power input of about ¾ horsepower. The density of the diamine solution decreases to about 0.6 g./cc. which is caused by air entrapment as the solution is stirred. The power number of the system, calculated according to the formula in the specification, is about 0.3.

The prepolymer solution is slowly added at a rate of about 18 parts/minute to the shoulder of the vortex created by the mixer of the chain-extender solution and the temperature of the chain-extender solution is maintained at about 50° C. during fibridation. As the prepolymer is added, it spreads evenly on the chain-extender solution to form a chain-extended polyurethane film which in about 0.4 second is sheared into fibrids by the blender blades.

Preparation of a fibrid sheet

The fibrids are filtered from the slurry by using a 20″ x 20″ paper-maker's hand sheet box having a nylon filter fabric at the bottom of the head box of the hand sheet mold. Subsequently, the fibrids are washed four times and the excess water is removed from the wet water-leaf by covering the water-leaf with a 3 mil fluorocarbon film and applying a vacuum of 24 inches of mercury to the bottom of the sheet for about 10 minutes. The percent solids of the sheet is about 32. The water-leaf is then couched from the filter cloth and dried at 110° C. for one hour.

Physical properties of the sheet

The following physical properties of the resulting sheet are determined by using well known standard test methods:

| | |
|---|---|
| Shrinkage of the sheet on drying _____percent__ | 19 |
| Thickness (average) _____inch__ | 0.047 |
| Percent elongation at break (50% relative humidity) | 545 |
| Tensile strength (50% relative humidity) __p.s.i.__ | 563 |
| Permeability value (g./hr./100m.²) | 4009 |
| Density _____g./cc.__ | 0.52 |
| Quality factor | 6250 |

Example 2

A leatherlike, flexible, moisture permeable synthetic sheet material is prepared from fibrids of Example 1. A two layer water-leaf is made by depositing a layer consisting of about 60 grams of the fibrids of Example 1 in a 20″ x 20″ paper-maker's mold. A second layer is then deposited over the first layer which consists of 144 grams of the fibrids of Example 1 and 36 grams of ¼″ length, 2.5 denier "Dacron" polyester staple fibers having a spontaneous elongation of 12.5% when heated to 100° C. The slurry used for the second layer is prepared by dispersing the "Dacron" polyester fibers and the polyurethane fibrids of Example 1. The two layered sheet is vacuum dewatered as in Example 1 and placed in a drying oven at 110° C. for about 1 hour. The sheet is then placed in a platen press and subjected to a pressure of 20 p.s.i. for 2 minutes while the platen contacting the first layer is at 180° C. and the other platen contacting the second layer is at 25° C. The sheet is removed from the press and cooled. The resulting product is a tough and flexible sheet material which resembles natural leather since the side which was heated is smooth and glossy similar to the outer or finished side of leather, while the other side of the sheet is fibrous and dull which is similar to the flesh side of natural leather. The resulting material is useful for such applications as shoes, slippers, handbags and luggage and the like.

Example 3

The following ingredients are charged into a conventional reaction vessel equipped with a stainless steel stirrer, a thermometer, means to introduce nitrogen and reagents and a condenser:

| | Parts by weight |
|---|---|
| Portion 1: | |
| Polyethyleneether glycol (molecular weight 1000) | 50 |
| Toluene | 25 |
| Portion 2: | |
| Methylene bis-(4-phenylisocyanate) | 25 |
| Total | 100 |

Portion 1 is charged into the reaction vessel and heated to 110° C. with constant stirring and held at this temperature until all water is removed. Portion 2 is then added and the reaction mixture is heated about 110° C. for about 90 minutes.

The prepolymer is cooled to room temperature and 132 parts by weight of acetone are added to give a prepolymer solution of about 33% solids and a solution viscosity at room temperature of about 0.06 poise (Brookfield Viscometer No. 1 spindle at 60 r.p.m.).

A 0.1 molar aqueous solution of hexamethylene diamine is prepared which has a density of about 1.0 g./cc., a pH of about 11.5 and the viscosity is about 0.1 poise (Brookfield Viscometer No. 1 spindle at 60 r.p.m.). The radial spread rate of the prepolymer solution is determined as in Example 1 and is about 3 to 9 cm./sec.

About 90 parts by weight of the prepolymer solution are slowly added as in Example 1 at the rate of about 18 parts per minute to about 2000 parts of the above diamine solution while the solution is stirred at about 4000 r.p.m. in a "Waring Blendor." The power input to the blender is about 1 horsepower. The density of the diamine solution decreases to about 0.6 g./cc. as air is entrapped in the solution. The power number of the system, calculated as in Example 1, is about 0.2. Fibrids are formed as in Example 1 in about 0.4 second.

A sheet material which has the following physical properties is prepared from the fibrids according to the procedure of Example 1:

| | |
|---|---|
| Shrinkage of the sheet on drying _____percent__ | 39 |
| Average thickness _____inch__ | 0.08 |
| Percent elongation at break (50% R.H.) _____ | 438 |
| Tensile strength at break (50% R.H.) ____p.s.i__ | 503 |
| Permeability value (g./hr./100 m.²) _____ | 2437 |
| Density _____g./cc__ | 0.594 |
| Quality factor _____ | 3400 |

A second batch of fibrids is formed by using the above prepolymer, the same process equipment and conditions with the exception that the diamine solution is diluted with water to a 0.01 molar concentration. With this diamine solution, the radial spread rate of the prepolymer determined as in Example 1 is about 150 cm./sec. Fibrids are formed as above and a sheet is made from these fibrids but the sheet is extremely brittle and weak, and breaks apart upon drying, thereby, making it impossible to evaluate its physical properties.

Example 4

The following ingredients are charged into a polymerization vessel to form a prepolymer solution:

| | Parts by weight |
|---|---|
| Polyethyleneether glycoladipate (molecular weight 2009; hydroxyl number 47.5) _____ | 29.50 |
| Anhydrous dioxane _____ | 100.00 |
| Methylene bis-(4-phenylisocyanate) _____ | 7.35 |
| Benzyl chloride _____ | 0.02 |
| Total _____ | 136.87 |

The mixture is heated to its reflux temperature and refluxed for 3 hours with constant agitation.

A 0.1 molar aqueous ethylene diamine solution is prepared containing about 0.25% by weight polyvinyl alcohol and has a density of 1.0 g./cc., a pH of 11.0 and a viscosity of 0.1 poise (Brookfield Viscometer No. 1 spindle at 60 r.p.m.). The radial spread rate of the above prepolymer solution is determined as in Example 1 and is about 3 to 9 cm./sec. About 112 parts by weight of the prepolymer solution are slowly added as in Example 1 to about 1800 parts by weight of the above diamine solution while the solution is being stirred in a "Waring Blendor" at about 3000 r.p.m. As air is entrapped in the diamine solution during stirring, the density decreases to about 0.6 g./cc. The blender requires a power input of about 0.5 horsepower. The power number of the system, calculated as in Example 1, is about 0.15. Fibrids are formed as in Example 1 in about 0.4 second.

A sheet material is prepared from the fibrids according to the procedure of Example 1 and has physical properties similar to the sheet material of Example 1.

Example 5

The following ingredients are charged into a polymerization vessel to form a prepolymer solution:

| | Parts by weight |
|---|---|
| Methylene bis-(4-phenylisocyanate) _____ | 36 |
| A solution of hydroxy terminated polyneopentylglycoladipate (38% solids solution in toluene, average molecular weight of the polymer is 959) _____ | 180 |
| Adipyl chloride _____ | 0.09 |
| Total _____ | 216.09 |

The mixture is blanketed with nitrogen and heated at 90° C. and held at this temperature for 3½ hours with constant stirring. The reaction mixture is cooled to room temperature and 143 parts of tetrahydrofuran are added to form a prepolymer solution.

A 0.1 molar aqueous hexamethylene diamine solution containing about 1% by weight of "Polyox" WSR–301 resin (described in Example 1) is prepared and has a density of 1.0 g./cc., a pH of 11.8, and a viscosity of 26.2 poises (Brookfield Viscometer No. 1 spindle at 60 r.p.m.). The radial spread rate of the above prepolymer solution is determined as in Example 1 and is about 2 to 6 cm./sec. About 150 parts by weight of the prepolymer solution are slowly added as in Example 1 to about 2000 parts by weight of the above diamine solution while the solution is being stirred in a "Waring Blendor" at about 6000 r.p.m. As air is entrapped in the diamine solution, the density decreases to about 0.6 g./cc. The blender requires a power input of about 0.75 horsepower. The power number of the system, calculated as in Example 1, is 0.25. Fibrids are formed in about 0.4 second.

A sheet material is prepared according to the procedure of Example 1 and has the following physical properties:

| | |
|---|---|
| Shrinkage of the sheet on drying _____percent__ | 15 |
| Thickness (average) _____inch__ | 0.044 |
| Percent elongation at break (50% R.H.) _____ | 120 |
| Tensile strength (50% R.H.) _____p.s.i__ | 390 |
| Quality factor _____ | 3100 |

Example 6

A prepolymer solution is formed by charging the following ingredients into a polymerization vessel:

| | Parts by weight |
|---|---|
| Polyethyleneetherglycolisophthalate (average molecular weight 979, hydroxyl number 97.5) __ | 22 |
| Dioxane _____ | 130 |
| Methylene bis-(4-phenylisocyanate) _____ | 11 |
| Total _____ | 163 |

The mixture is heated to its reflux temperature and with constant agitation refluxed for 2 hours. About 0.2 part by weight benzyl chloride is added to the mixture and the mixture is cooled to room temperature.

A chain-extender solution is prepared by blending the following ingredients:

| | Parts by weight |
|---|---|
| Water _____ | 1000 |
| Dimethyl formamide _____ | 1000 |
| Diethylene triamine _____ | 21 |
| Polyvinyl alcohol _____ | 5 |
| Total _____ | 2026 |

The density of the solution is about 1.0 g./cc., the pH is between 9 and 12 and the viscosity is 0.1 poise (Brookfield Viscometer No. 1 spindle at 60 r.p.m.). The radial spread rate of the above prepolymer solution is determined as in Example 1 and is about 3 to 7 cm./sec.

About 141 parts by weight of the prepolymer solution are slowly added as in Example 1 to about 2000 parts by weight of the above chain-extender solution while the solution is being stirred in a "Waring Blendor" at about 4000 r.p.m. As air is entrapped in the diamine solution, the density is decreased to about 0.6 g./cc. The blender requires a power input of about 0.6 horsepower and the power number of the system, calculated as in Example 1, is about 0.20. Fibrids are formed as in Example 1 in about 0.4 second.

The fibrids are washed and formed into a sheet according to the procedure of Example 1. The dried sheet is then placed in a Carver press in which the upper platen is at 120° C. and the lower platen is at 175° C. and is pressed at 100 p.s.i. for one minute. The resulting sheet material is stiff and rigid and is useful for floor tiles, decorative wall panels, ceiling tiles for sound insulation, and the like.

The sheet has the following physical properties:

| | |
|---|---|
| Thickness (average) _____ inch__ | 0.052 |
| Percent elongation at break (50% R.H.) _____ | 8 |
| Tensile strength (50% R.H.) _____ p.s.i.__ | 520 |
| Initial modulus _____ p.s.i.__ | 56,000 |
| Permeability value (g./hr./100m.²) _____ | 1300 |
| Quality factor _____ | 2900 |

Example 7

A prepolymer is formed by charging the following ingredients into a polymerization vessel:

| | Parts by weight |
|---|---|
| Polyethyleneether glycol (average molecular weight 1000) | 21 |
| Polypropyleneether glycol (average molecular weight 1025) | 21 |
| Trimethylol propane | 5.6 |
| Methylene bis-(4-phenylisocyanate) | 52.4 |
| Total | 100.0 |

The mixture is heated to about 95° C. and held at this temperature for about 3 hours with constant stirring. About 11.3 parts by weight of the prepolymer are dissolved in 18.7 parts by weight toluene to form a prepolymer solution.

A chain-extender solution is formed by blending the following ingredients:

| | Parts by weight |
|---|---|
| Water | 2000 |
| "Jaguar" 507 (guar gum) | 5 |
| Ethylene diamine | 6 |
| Total | 2011 |

The density of the chain-extender solution is about 1 g./cc., the pH is about 10.4, and the viscosity is 0.7–1.0 poise (Brookfield Viscometer No. 2 spindle at 60 r.p.m.). The radial spread rate of the above prepolymer solution, determined as in Example 1, is about 5 to 7 cm./sec.

The prepolymer solution is slowly added as in Example 1 to about 2000 parts of the diamine solution while the solution is being stirred in a "Waring Blendor" at about 7000 r.p.m. As air is entrapped in the diamine solution, the density descreases to about 0.6 g./cc. The blender requires a power input of about 1 horsepower and the power number of the system, calculated as in Example 1, is about 0.32. Fibrids are formed as in Example 1 in about 0.4 second.

The fibrids are washed and formed into a sheet according to the procedure of Example 1. The sheet has the following physical properties:

| | |
|---|---|
| Shrinkage of the sheet on drying _____ percent__ | 12 |
| Thickness (average) _____ inch__ | 0.034 |
| Percent elongation break (50% R.H.) _____ | 51 |
| Tensile strength (50% R.H.) _____ p.s.i.__ | 235 |
| Initial modulus _____ p.s.i.__ | 1750 |
| Permeability value (g./hr./100 m.²) _____ | 6963 |
| Density _____ g./cc.__ | 0.27 |
| Quality factor _____ | 8550 |

Example 8

A prepolymer solution is prepared by mixing 12.6 parts of the prepolymer of Example 1 with 37.4 parts of acetone. A chain-extender solution is prepared by mixing 2000 parts by weight of water with 10.3 parts by weight of diethylene triamine. The chain-extender solution has a density of about 1.0 g./cc., a pH of about 11.4 and a viscosity of 0.01 poise (Brookfield Viscometer No. 2 spindle at 30 r.p.m.). The radial spread rate of the prepolymer solution, determined as in Example 1, is about 5 to 7 cm./sec. Fibrids are formed using the identical fibridation conditions of Example 1 by adding the prepolymer solution to the chain-extender solution. The power number of the system is about 0.3.

A sheet material is prepared from the fibrids according to the procedure of Example 1 and has the following physical properties:

| | |
|---|---|
| Thickness (average) _____ inch__ | 0.014 |
| Percent elongation (50% R.H.) _____ | 150 |
| Tensile strength (50% R.H.) _____ p.s.i.__ | 121 |
| Initial modulus _____ p.s.i.__ | 719 |
| Permeability value (g./hr./100 m.²) _____ | 6600 |
| Density _____ g./cc.__ | 0.56 |
| Quality factor _____ | 2500 |

Example 9

A prepolymer solution is prepared by mixing 12.6 parts of the prepolymer of Example 1 with 37.4 parts of acetone. A chain-extender solution is prepared by mixing 2000 parts by weight of water with 8.8 parts by weight of 1,4-butane diamine. The chain-extender solution has a density of 1.0 g./cc., a pH of about 11.4 and a viscosity of 0.03 poise (Brookfield Viscometer No. 2 spindle at 30 r.p.m.). The radial spread rate of the prepolymer solution, determined as in Example 1, is about 5 to 7 cm./sec. Fibrids are formed using the identical fibridation conditions of Example 1 by adding the prepolymer solution to the chain extender solution. The power number of the system is about 0.3.

A sheet material is prepared from the fibrids according to the procedure of Example 1 and has the following physical properties:

| | |
|---|---|
| Thickness (average) _____ inch__ | 0.014 |
| Percent elongation (50% R.H.) _____ | 27 |
| Tensile strength (50% R.H.) _____ p.s.i.__ | 128 |
| Initial modulus _____ p.s.i.__ | 723 |
| Permeability value (g./hr./100 m.²) _____ | 6600 |
| Density _____ g./cc.__ | 0.56 |
| Quality factor _____ | 2650 |

Example 10

About 19 parts by weight of the prepolymer of Example 3 are mixed with 21 parts of methylethyl ketone and 23 parts of acetonitrile to form a prepolymer solution. A chain-extender is formed by mixing 17.5 parts by weight triethylene tetramine and 10 parts of sodium carboxymethyl cellulose with 2000 parts of water. The chain-extender solution has a density of 1.0 g./cc., a pH solution between 9 and 12 and a viscosity of 1.0 poise (Brookfield Viscometer No. 2 spindle at 30 r.p.m.). The radial spread rate of the prepolymer solution, determined as in Example 1, is about 5 to 7 cm./sec. Fibrids are formed using the identical fibridation conditions of Example 1 by adding the prepolymer solution to the chain extender solution. The power number of the system is about 0.3.

A sheet material is prepared from the fibrids according to the procedure of Example 1 and has the following physical properties:

| | |
|---|---|
| Thickness (average) _____ inch__ | 0.04 |
| Percent elongation (50% R.H.) _____ | 90 |
| Tensile strength (50% R.H.) _____ p.s.i.__ | 100 |
| Initial modulus _____ p.s.i.__ | 200 |
| Permeability value (g./hr.100 m.²) _____ | 4900 |
| Quality factor _____ | 2900 |

Example 11

The following ingredients are charged into a conventional reaction vessel equipped with a stirrer, thermometer and means to introduce nitrogen and a condenser:

| | Parts by weight |
|---|---|
| Polytetramethyleneether glycol (molecular weight 1000) | 67 |
| Methylene bis-(4-phenylisocyanate) | 33 |
| Total | 100 |

The mixture is blanketed with nitrogen and is heated to 110° C. and held at this temperature with constant agitation for about 90 minutes.

About 50 parts by weight of the above prepolymer are mixed with 50 parts by weight of a prepolymer prepared according to Example 3 and this mixture is dissolved in 200 parts by weight dioxane.

A 0.1 molar aqueous hexamethylene diamine solution is prepared containing about 0.5% by weight of "Jaguar" 507 (guar gum) and has a density of 1.0 g./cc., a pH of 11.6 and a viscosity of 2.3 poises (Brookfield Viscometer No. 2 spindle at 60 r.p.m.). The radial spread rate of the above prepolymer is determined as in Example 1 and is about 5 cm./sec.

About 90 parts by weight of the above prepolymer solution are slowly added at the rate of 7.5 parts/minute as in Example 1 to about 2000 parts by weight of the above diamine solution while the solution is being stirred in a "Waring Blendor" at about 6000 r.p.m. As air is entrapped in the diamine solution, the density decreases to about 0.6 g./cc. Fibrids are formed as in Example 1 in about 0.4 second. The blender requires a power input of about 1 horsepower. The power number of the system is about 0.3.

A sheet material prepared according to the procedure of Example 1 has the following physical properties:

| | |
|---|---|
| Shrinkage of the sheet on drying  percent | 27 |
| Thickness (average)  inch | 0.098 |
| Density  g./cc. | 0.398 |
| Permeability value (g./hr./100 m.²) | 5313 |
| Percent elongation at break (50% R.H.) | 245 |
| Tensile strength at break (50% R.H.) p.s.i | 267 |
| Initial modulus (50% R.H.) p.s.i | 436 |

Example 12

The following ingredients are mixed to form a prepolymer solution:

| | Parts by weight |
|---|---|
| Bis-chloroformate of polytetramethyleneether glycol—average molecular weight 1000 | 4 |
| Bis-chloroformate of polytetramethyleneether glycol—average molecular weight 2000 | 19 |
| Bis-chloroformate of 1,4-butandiol | 10 |
| Tetrahydrofuran | 67 |
| Total | 100 |

Each of the above bis-chloroformate reaction products is prepared according to the procedure of Example 2 of Carter et al. U.S. Patent 2,835,654.

A 0.1 molar aqueous hexamethylene diamine solution containing about 1% by weight of "Polyox" WSR-301 resin (described in Example 1) is prepared and has a density of 1 g./cc., a pH of 11, and a viscosity of 1.7 poises (Brookfield Viscometer No. 2 spindle at 60 r.p.m.). The radial spread rate of the above prepolymer solution is determined as in Example 1 and is about 5 cm./sec. About 100 parts by weight of the above prepolymer solution are slowly added as in Example 1 to about 2000 parts by weight of the above diamine solution while the solution is being stirred in a "Waring Blendor" at about 6000 r.p.m. As air is entrapped in the diamine solution, the density decreases to about 0.6 g./cc. Fibrids are formed in about 0.4 second. The blender requires a power input of about 1 horsepower. The power number of the system, calculated as in Example 1, is about 0.28.

A sheet material is prepared from the fibrids according to the procedure of Example 1 and the resulting sheet material has physical properties which are comparable to the physical properties of the sheet material of Example 1.

Example 13

This example illustrates a continuous process for the preparation of microporous polyurethane fibrids. A 70-pound batch of prepolymer solution is prepared by dissolving 33 parts of the prepolymer of Example 1 in 66 parts of tetrahydrofuran.

Seventy-five gallons of a 0.124 molar aqueous hexamethylene diamine solution containing about ½% by weight "Polyox" WSR-301 resin (described in Example 1) are prepared. The diamine solution has a density of 1 g./cc., a pH of 12 and a viscosity of 30 centipoises at 32° C.

The radial spread rate of the above prepolymer solution is determined as in Example 1 and is about 8 cm./sec.

The container of a commercial 1 gallon "Waring Blendor" Model CB-4 is modified for a continuous fibridation process by cutting a rectangular hole in the side 2" below the top and attaching an overflow through to the hole.

The blender is charged with 1500 cc. of the above amine solution and the diamine solution is stirred at about 7000 r.p.m. The density of the diamine solution decreases to about 0.6 as air is entrapped during the stirring. The above prepolymer solution is added at the rate of 70 cc./min. through a 60 mil diameter nozzle located 6" above the top of the blender and positioned just over the shoulder of the vortex of the liquid amine solution) in the blender on the opposite side from the overflow trough. The amine solution feed is pumped at a rate of 500 cc./min. in the blender. The blender required a power input of about 0.75 horsepower and the power number of the system, calculated as in Example 1, is about 0.30.

As the prepolymer is added, it spreads evenly over the amine solution to form a film which is sheared into fibrids in about 0.4 second. When the level of the mixture in the blender reached the height of the overflow trough, the mixture of diamine and fibrids is collected in a suitable container.

During this process, the temperature of the diamine solution which is added is controlled at 33° C. and the prepolymer solution temperature is held at 20° C. Under these conditions, the temperature of the reaction mixture in the blender is about 45° C. The process is continued for 8.4 hours at the above conditions.

The blender effluent mixture is filtered on batch vacuum filters and the fibrids are washed 4 times with water. After the final wash, the fibrids are again filtered and the resulting fibrid cake contains about 30% fibrid solids.

Three 20 gram sheets are made from these fibrids by forming a slurry of 20 grams for 10 minutes at 4000 r.p.m. in a one gallon "Waring Blendor." The slurry is then further diluted to 0.25% solids concentration in the head box of an 8" x 8" sheet mold and filtered on a nylon filter fabric.

After the wet fibrid sheets are formed, the sheets and the filter fabric are removed from the mold and the sheet is stapled to a 12" x 12" piece of beaverboard to minimize sheet shrinkage on drying. These assemblies are dried in a hot air oven at 110° C. for 1 hour. The sheet was then removed from the board and peeled off the filter fabric. The resulting sheet materials have the following pysical properties:

| | | | |
|---|---|---|---|
| Shrinkage on drying, percent | 4 | | 44 |
| Thickness (inches) | .048 | .048 | .048 |
| Tensile strength (p.s.i.) | 487 | 493 | 503 |
| Permeability value (g./hr./100 m.²) | 5,807 | 5,989 | 5,889 |
| Density (g./cc) | 0.43 | 0.46 | 0.45 |

Example 14

The identical prepolymer, diamine solution, process equipment and process conditions are used as in Example 13 to make fibrids in a continuous process except the prepolymer is fed directly into the blades of the blender instead of onto the shoulder of the vortex of the diamine solution. The prepolymer solution is mechanically spread by the blender blades on the surface of the diamine solution and then chain-extended polyurethane film is sheared into fibrids by the blender blades. Under these conditions, the chain-extended polyurethane film is formed and sheared into fibrids in an extreme rapid succession and for practical purposes, formation and shearing of the film occurs almost instantaneously.

Sheet materials are prepared from the fibrids and have physical properties which are almost identical to the fibrids sheets of Example 13.

What is claimed is:
1. A process for the production of microporous polyurethane fibrids which comprises
   (a) forming a polyurethane prepolymer solution having a radial spread rate of about 1 to 40 centimeters/second in which the prepolymer is formed from an active-hydrogen containing material and in which the terminal groups of the prepolymer are selected from the group consisting of

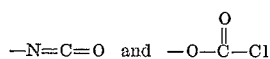

(b) forming a polyurethane film by adding said prepolymer solution to an amine solution under conditions wherein the prepolymer solution spreads freely on the surface of said amine solution; said amine solution having a pH of at least 8 and comprising a non-solvent for the resulting polyurethane polymer and at least one amine having at least two amino nitrogen atoms each having at least one active hydrogen attached thereto;
   (c) shearing the polyurethane polymer film into microporous fibrids after said film is formed; the shear conditions being such that the power number is about 0.03 to 3.

2. The process of claim 1 in which the microporous polyurethane fibrids form a sheet material having a quality factor of about 2500 to 30,000.

3. The process of claim 1 in which the polyurethane prepolymer solution has a spread rate of about 2 to 20 centimeters/second, said film being sheared into fibrids within about 4 seconds after said film is formed and said shear conditions being such that the power number is about 0.1 to 2.

4. The process of claim 1 in which a polyurethane prepolymer solution having about 30 to 60% solids is formed by reacting an organic diisocyanate with an active hydrogen containing material of the group consisting of polyether glycols and hydroxy terminated polyesters to form a prepolymer with terminal isocyanate groups.

5. The process of claim 1 in which a polyurethane prepolymer solution having about 30 to 60% solids is formed by reacting phosgene with a polyether glycol to form a prepolymer with terminal acid chloride groups.

6. A process for the production of microporous chain-extended polyurethane fibrids which comprises
   (a) forming a polyurethane prepolymer solution having a radial spread rate of about 1 to 40 centimeters/second in which the prepolymer is formed by reacting an organic diisocyanate with an active hydrogen containing polymeric material to form an isocyanate terminated polyurethane prepolymer;
   (b) forming a chain-extended polyurethane film by adding said prepolymer solution to a chain-extender solution under conditions wherein the prepolymer solution spreads freely on the surface of said chain-extender solution; said chain-extender solution having a pH of at least 8 and comprising a non-solvent for the resulting polyurethane polymer and at least one amine having at least two amino nitrogen atoms each having at least one active hydrogen attached thereto;
   (c) shearing the chain-extended polyurethane polymer film into microporous fibrids after said film is formed; the shear conditions being such that the power number is about 0.03 to 3.

7. The process of claim 6 in which the prepolymer is formed from an arylene diisocyanate and a polyalkyleneether glycol.

8. The process of claim 6 in which the prepolymer is formed from methylene bis-(4-phenylisocyanate), polyethyleneether glycol, and polypropyleneether glycol and in which the chain-extender is hexamethylene diamine.

9. The process of claim 6 in which the prepolymer is formed from methylene bis-(4-phenylisocyanate), polyethyleneether glycol and polytetramethyleneether glycol and in which the chain-extender is hexamethylene diamine.

10. The process of claim 6 in which the prepolymer is formed from methylene bis-(4-phenyl isocyanate), polyethyleneether glycol, polypropyleneether glycol, and trimethylol propane and in which the chain-extender is ethylene diamine.

11. The process of claim 6 in which the prepolymer is formed from methylene bis-(4-phenylisocyanate), and polyhydroxyethylisophthalate and in which the chain-extender is diethylene triamine.

References Cited

UNITED STATES PATENTS

| | | | |
|---|---|---|---|
| 2,988,782 | 6/1961 | Parrish et al. | 264—69 |
| 2,999,788 | 9/1961 | Morgan | 264—123 XR |
| 3,062,702 | 11/1962 | Parrish et al. | 162—157 |
| 3,068,527 | 12/1962 | Morgan | 264—143 |
| 3,100,733 | 8/1963 | Bundy | 264—112 XR |

ALEXANDER H. BRODMERKEL, *Primary Examiner.*

P. E. ANDERSON, *Assistant Examiner.*